(12) United States Patent
Langendorf et al.

(10) Patent No.: US 7,969,445 B2
(45) Date of Patent: Jun. 28, 2011

(54) SYSTEM, METHOD, AND COMPUTER PROGRAM PRODUCT FOR BROADCASTING WRITE OPERATIONS

(75) Inventors: Brian Keith Langendorf, Benicia, CA (US); James P. Reilley, Sunnyvale, CA (US); Suyash Ranjan, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 950 days.

(21) Appl. No.: 11/765,676

(22) Filed: Jun. 20, 2007

(65) Prior Publication Data

US 2008/0316842 A1 Dec. 25, 2008

(51) Int. Cl.
*G06F 15/16* (2006.01)
*G06T 1/60* (2006.01)
(52) U.S. Cl. ........................................ 345/502; 345/530
(58) Field of Classification Search .............. 345/501, 345/502; 707/609
See application file for complete search history.

(56) References Cited

U.S. PATENT DOCUMENTS

| | | | | |
|---|---|---|---|---|
| 7,015,915 B1 * | 3/2006 | Diard | | 345/522 |
| 7,065,630 B1 * | 6/2006 | Ledebohm et al. | | 711/206 |
| 2002/0029281 A1 * | 3/2002 | Zeidner et al. | | 709/230 |
| 2003/0164826 A1 * | 9/2003 | Lavelle et al. | | 345/419 |
| 2005/0190190 A1 | 9/2005 | Diard et al. | | |
| 2005/0267729 A1 * | 12/2005 | Poplack et al. | | 703/25 |
| 2007/0245046 A1 * | 10/2007 | Asaro et al. | | 710/62 |
| 2008/0059542 A1 * | 3/2008 | Atluri et al. | | 707/204 |

OTHER PUBLICATIONS

Office Action from Chinese Application No. 200810125392.9, dated Sep. 26, 2010.
Notice of Preliminary Rejection (Non-Final) from the Korean Intellectual Property Office for Korean Patent Application No. 10-2008-58547.
First Office Action from Japanese Application No. 2008-162220, including Japanese Publications 2008-533564, 2002-532806, and 06083706, dated Mar. 15, 2011.

* cited by examiner

*Primary Examiner* — Kee M Tung
*Assistant Examiner* — Jacinta Crawford
(74) *Attorney, Agent, or Firm* — Zilka-Kotab, PC

(57) ABSTRACT

A system, method, and computer program product are provided for broadcasting write operations in a multiple-target system. In use, a write operation is received at one of a plurality of apertures of an address space. Such write operation is then replicated to produce a plurality of write operations. To this end, the write operations may be broadcasted to a plurality of targets. At least one of the targets includes another one of the apertures that produces at least one additional write operation.

19 Claims, 11 Drawing Sheets

SYSTEM, METHOD, AND COMPUTER PROGRAM PRODUCT FOR BROADCASTING WRITE OPERATIONS

FIELD OF THE INVENTION

The present invention relates to multiple-device systems, and more particularly to replicating a write operation for broadcasting write operations across multiple devices.

BACKGROUND

In multiple-device systems, there is frequently a need to write the same data to memory associated with each of the devices. On exemplary multiple-device system includes the NVIDIA Scalable Link Interface (SLI) graphics system. During use of such systems, it is often desirable to allow an associated graphics driver to perform a single write operation, but have hardware write the associated data to memory associated with each of the multiple devices.

One potential problem that arises when attempting to support such a capability occurs when a write operation initiated by a first device is delivered to the driver which, in turn, replicates such write operation not only for each of the other devices, but the first device as well. In such situation, it is possible that the system may be encumbered with infinite loops, deadlocks, etc. There is thus a need for addressing these and/or other issues associated with the prior art.

SUMMARY

A system, method, and computer program product are provided for broadcasting write operations in a multiple-target system. In use, a write operation is received at one of a plurality of apertures of an address space. Such write operation is then replicated to produce a plurality of write operations. To this end, the write operations may be broadcasted to a plurality of targets. At least one of such targets includes another one of the apertures that produces at least one additional write operation.

DETAILED DESCRIPTION

Figure 1:
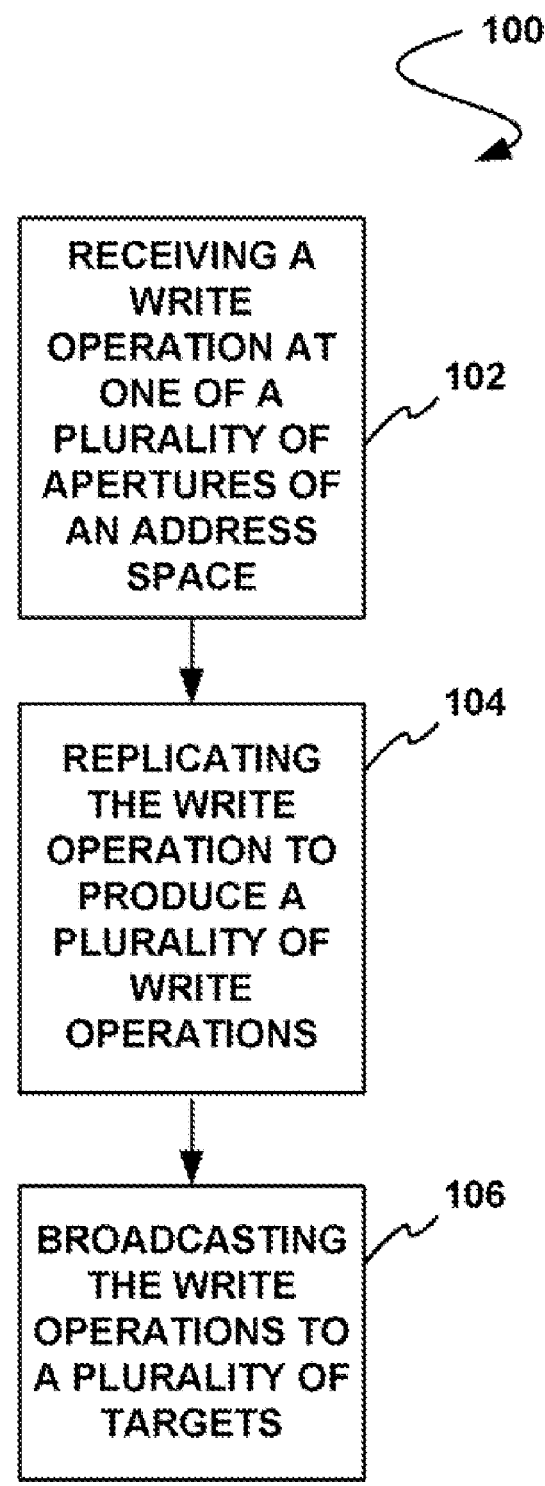
FIG. 1 shows a method for broadcasting write operations in a multiple-target system, in accordance with one embodiment.

FIG. 1 shows a method 100 for broadcasting write operations in a multiple-target system, in accordance with one embodiment. As shown, a write operation is received at one of a plurality of apertures of an address space. See operation 102. In the context of the present description, the apertures each refer to a unique portion of the address space that, upon receipt of a write operation, prompts the replication thereof (as will soon become apparent). For example, in various embodiments, the apertures may each include, but are not limited to an address range, a discontinuous collection of addresses, and/or any other aperture that meets the above definition.

In various embodiments, the address space may include any logical and/or physical address space. Still yet, the address space may correlate with different portions of a single memory or different memories (i.e. different memory integrated circuits, etc.). Still yet, such memory may be general memory and/or associated with one or more processors (e.g. graphics processors, etc.)

With continuing reference to FIG. 1, the received write operation is then replicated to produce a plurality of write operations. See operation 104. Such replication may include any mechanism by which receipt of a single write operation results in a plurality of such write operations.

To this end, the replicated write operations may be broadcasted to a plurality of targets. See operation 106. In the context of the present description, the aforementioned targets refer to any portion of the address space and may or may not overlap the apertures of operation 102. Further, such broadcasting refers to any sort of communication that results in the target receiving the corresponding write operation.

It should be noted that any number (1, 2-N) of apertures, targets, replications, etc. may be employed in various embodiments. For example, receipt of a write operation configured to write certain data to a particular target, may result in multiple operations for writing the same certain data to multiple targets. While, in such example, the data being written may be identical it should be noted that the protocol, format, and/or other aspects associated with the replicated write operations may or may not be identical depending on system configuration, etc. (while still being considered a "replication").

In use, at least one of the targets of operation 106 includes another one of the apertures, so that at least one additional write operation is produced. To this end, in one exemplary embodiment, a first write operation may not only result in the replication set forth in operation 104, but additional replication, as well, that produces yet additional write operations.

Still yet, in some embodiments, the foregoing actions may be repeated. For example, the additional write operation may be replicated to produce a plurality of additional write operations for a plurality of additional targets at least one of which includes another one of the apertures that produces at least one additional write operation. Of course, any number of additional apertures may be traversed in such manner, producing any desired number of write operations.

For facilitating such replication of write operations while still avoiding infinite loops, etc., write operations that would result in such problems may be filtered. For instance, if a write operation is found to target an aperture which, in turn, targets itself, such write operation may be disallowed.

In one embodiment designed to provide additional flexibility as to the manner which write operations affect certain targets, etc., the apertures may be hierarchically organized. For example, the apertures may be assigned different hierarchies (0, 1, 2-N). In one possible embodiment, such hierarchies may be predetermined.

To this end, the write operations of operation 106 may be conditionally allowed using the aforementioned hierarchies. For example, the write operations may be conditionally allowed based on a write operation level assigned based on which of the apertures was traversed by a particular write operation, and a hierarchy of one of the apertures targeted by the particular write operation. In one embodiment, a particular write operation may be allowed only if a write operation level (assigned based on which of the apertures was traversed by the particular write operation) is greater than a hierarchy of one of the apertures targeted by the particular write operation.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
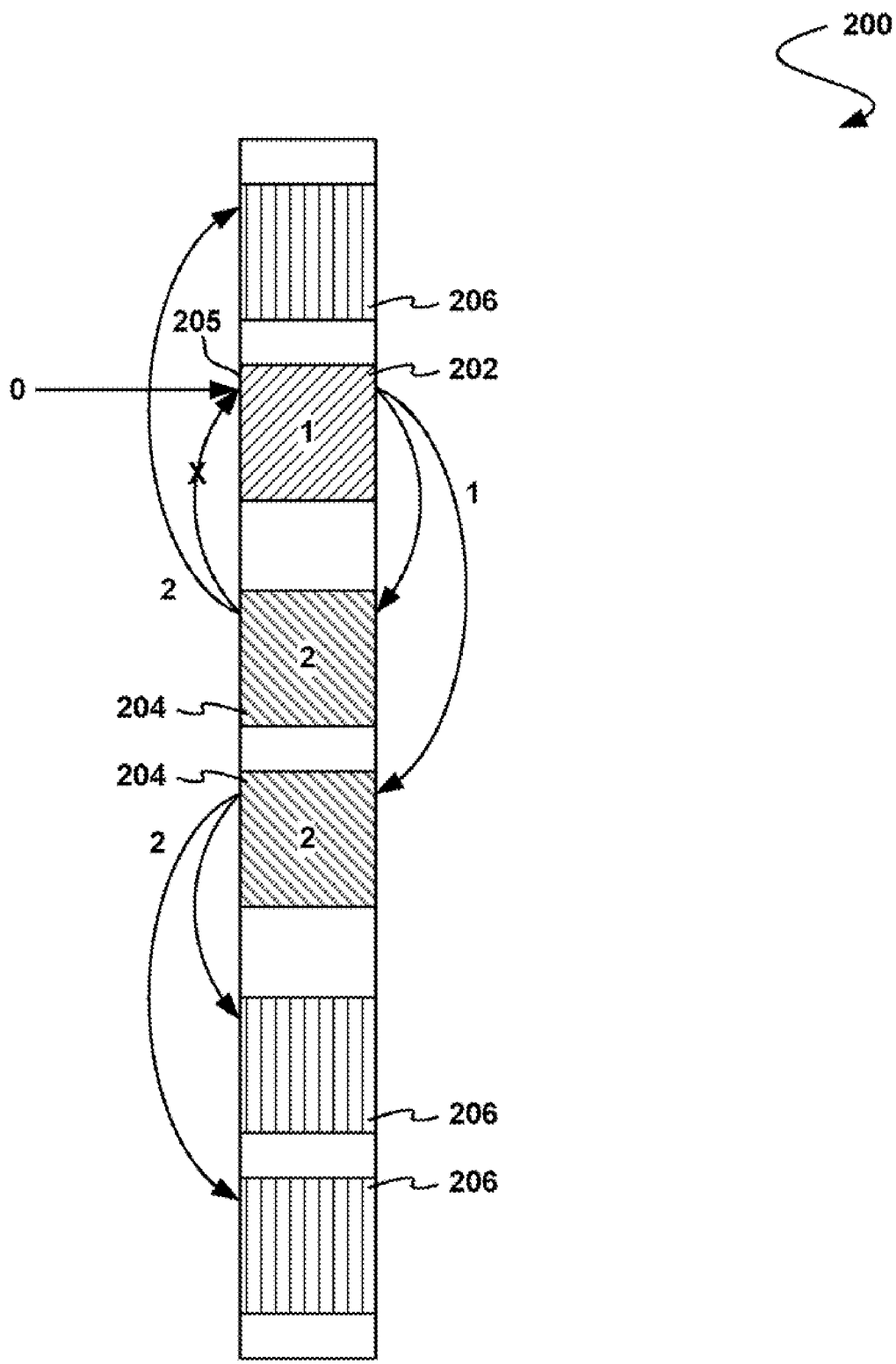
FIG. 2 shows a multiple aperture address space for broadcasting write operations, in accordance with one embodiment.

FIG. 2 shows a multiple aperture address space 200 for broadcasting write operations, in accordance with one embodiment. As an option, the present address space 200 may be implemented to carry out the method 100 of FIG. 1. Of course, however, the address space 200 may be implemented in any desired environment. It should also be noted that the aforementioned definitions may apply during the present description.

As shown, the address space 200 includes a first-level aperture 202 adapted for prompting the replication of a level-0 write operation 0 upon the receipt thereof. In one embodiment, the level-0 write operation 0 may be received from a central processing unit (CPU), or any other source for that matter.

In the present example, the first-level aperture 202 replicates the level-0 write operation 0 twice to generate two level-1 write operations 1 in the manner shown. As illustrated, the two level-1 write operations 1 are broadcasted to two targets of the same size which take the form of two second-level apertures 204. As shown, an offset 205 with which the level-0 write operation 0 is applied to the first-level aperture 202 is replicated in the application of the two level-1 write operations 1 to the second-level apertures 204.

It should be noted that, while a dual replication is set forth in the present example, any number of replications may be employed. Of course, more or less targets may be subjected to the write operations which may or may not overlap with any number of apertures. Still yet, the targets may correlate with different portions of a single memory or any number of different memories (e.g. different memory integrated circuits associated with different devices, etc.). By this design, a very flexible framework is provided.

By virtue of the fact that the targets took the form of second-level apertures 204, such level-1 write operations 1 prompt the replication and broadcast of, in this example, four level-2 write operations 2 to various targets. In this case, such targets include three non-aperture targets 206 which do not prompt further write operation replication, as well as the first-level aperture 202.

Thus, as is now apparent, the various apertures are each associated with a predetermined hierarchical level (1, 2-N). Further, the level of a write operation is designed as X, where X includes the level of an aperture that is last traversed (and X=0 for the original write operation). Of course, such convention is merely set forth for clarifying the description of the address space 200, as any convention may be used.

In the present hierarchical framework, a rule is established where a level of a broadcasted write operation may not exceed a level of a targeted aperture. Such rule may be established for a variety of reasons including, but not limited to avoiding infinite loops, etc. By this design, the level-2 write operation 2 that targets the first-level aperture 202 may be filtered and thus blocked from being applied, as shown. Of course, other embodiments are envisioned with or without such hierarchies and with or without such rule. Further, any overlap of targets and apertures may be configured in any desired manner.

Additional information will now be set forth regarding a variety of different configurations and exemplary transactions during the description of FIGS. 3-10. Of course, the following information is set forth for illustrative purposes only and should not be construed as limiting in any manner whatsoever.

Figure 3:
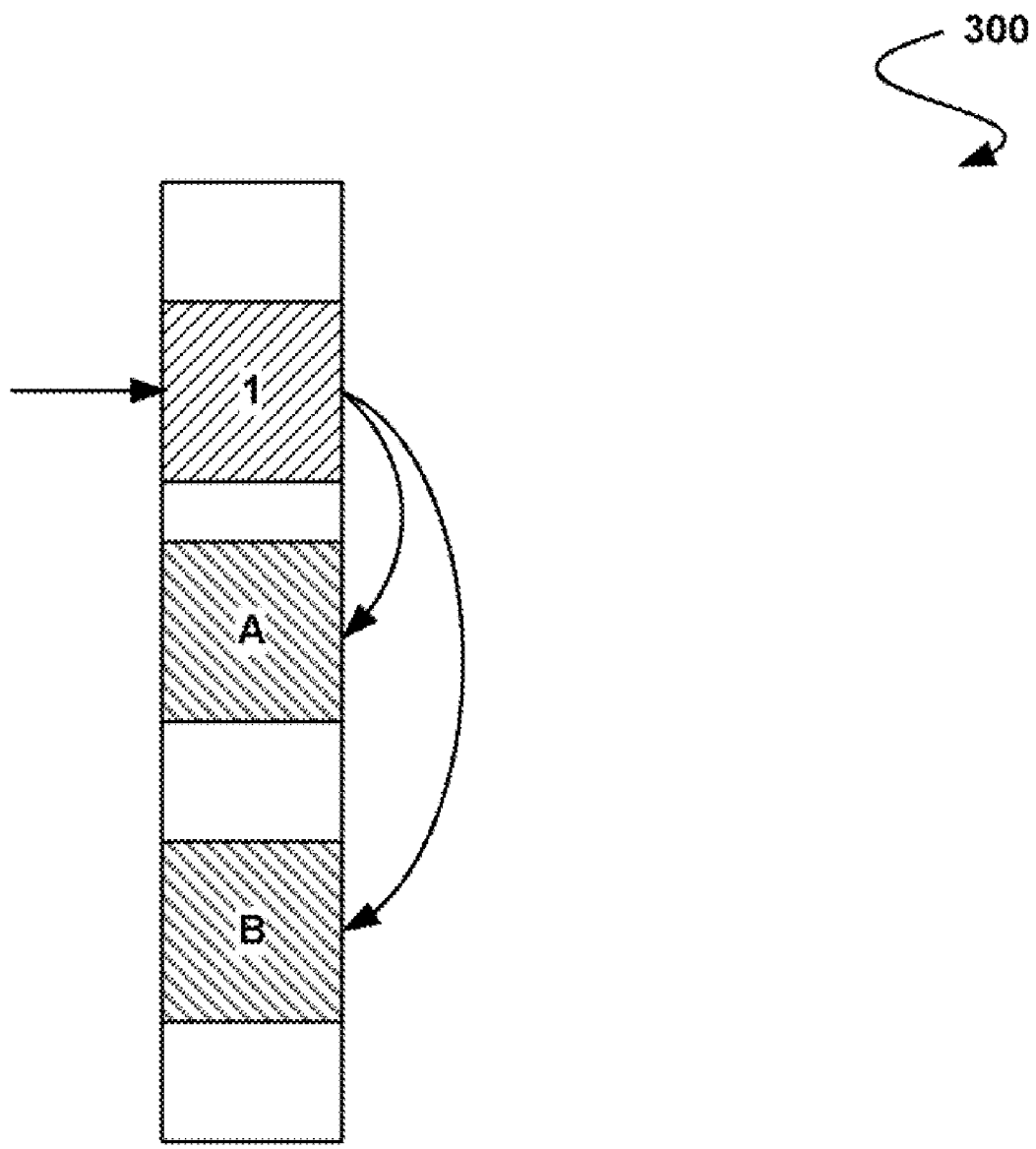
FIG. 3-10 shows various configurations with different numbers of targets and apertures which may or may not overlap, in accordance with different embodiments.

FIG. 3 shows a configuration 300 with two targets A, B which may correlate with two devices (e.g. graphics processors, etc.), in accordance with one embodiment. As shown, there is no overlap of the targets and a broadcast aperture 1.

Figure 4:
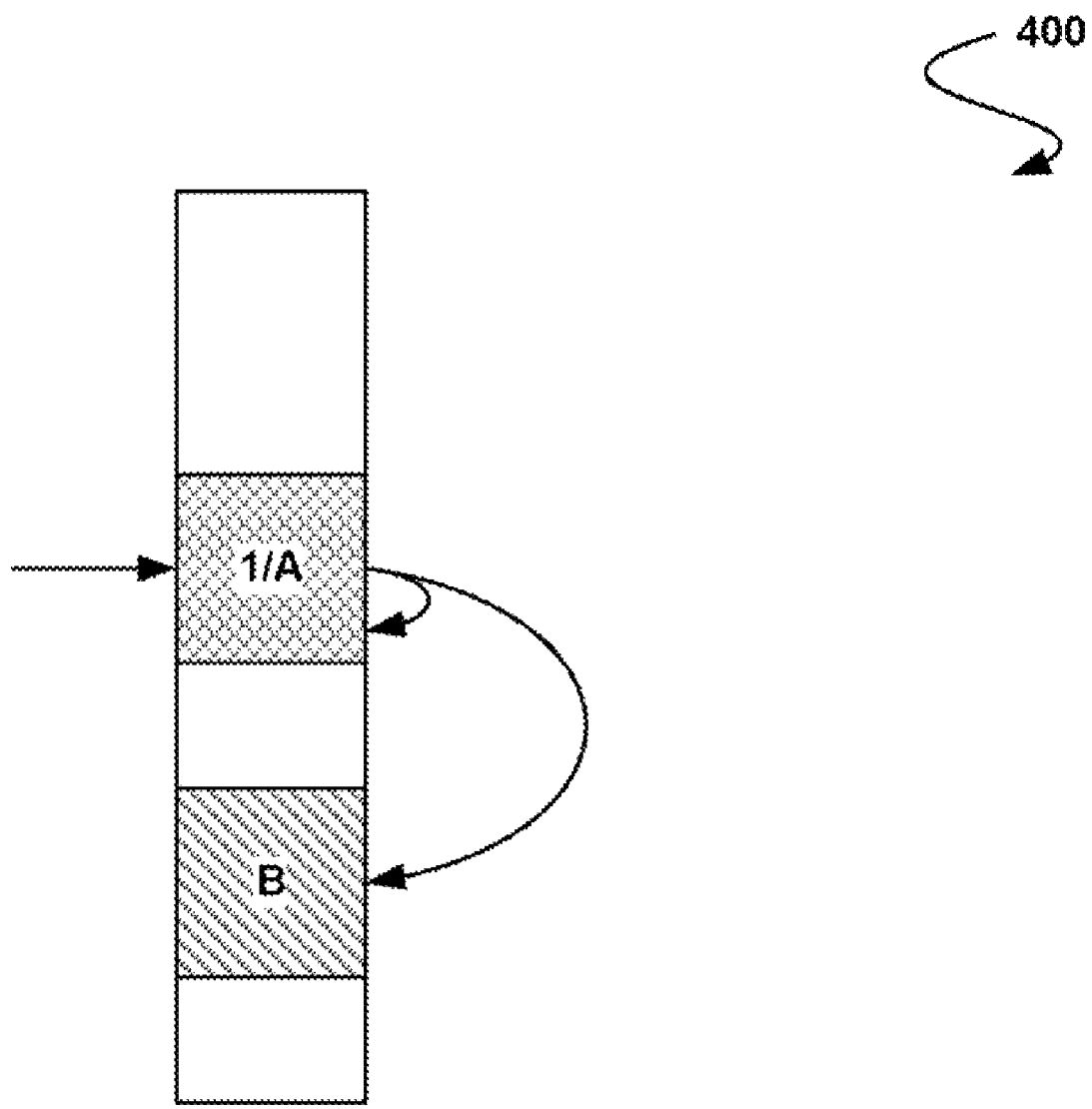

FIG. 4 shows a configuration 400 with two targets A, B which may correlate with two devices (e.g. graphics processors, etc.), in accordance with another embodiment. As shown, there is overlap of target A and a broadcast aperture 1. In one possible embodiment, such configuration may be used when multiple graphics processors are connected to a single PCIE controller via the use of a PCIE bridge chip or the like.

Figure 5:
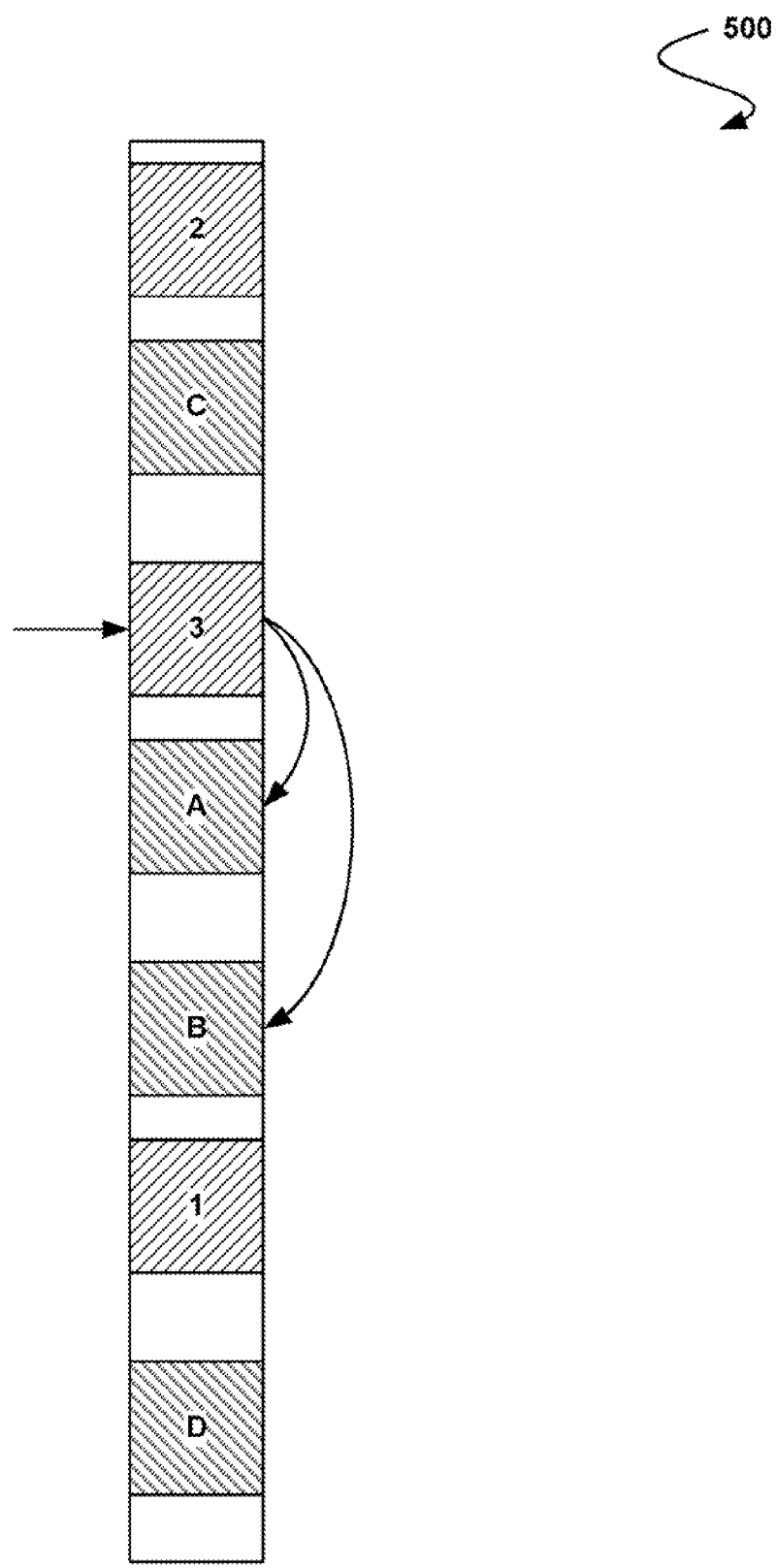

FIG. 5 shows a configuration 500 with four targets A, B, C, D which may correlate with four devices (e.g. graphics processors, etc.), in accordance with yet another embodiment. There is no overlap of the targets A, B, C, D and three broadcast apertures 1, 2, 3. As shown, a write operation is received at and replicated by broadcast aperture 3 and broadcasted to non-aperture targets A, B.

Figure 6:
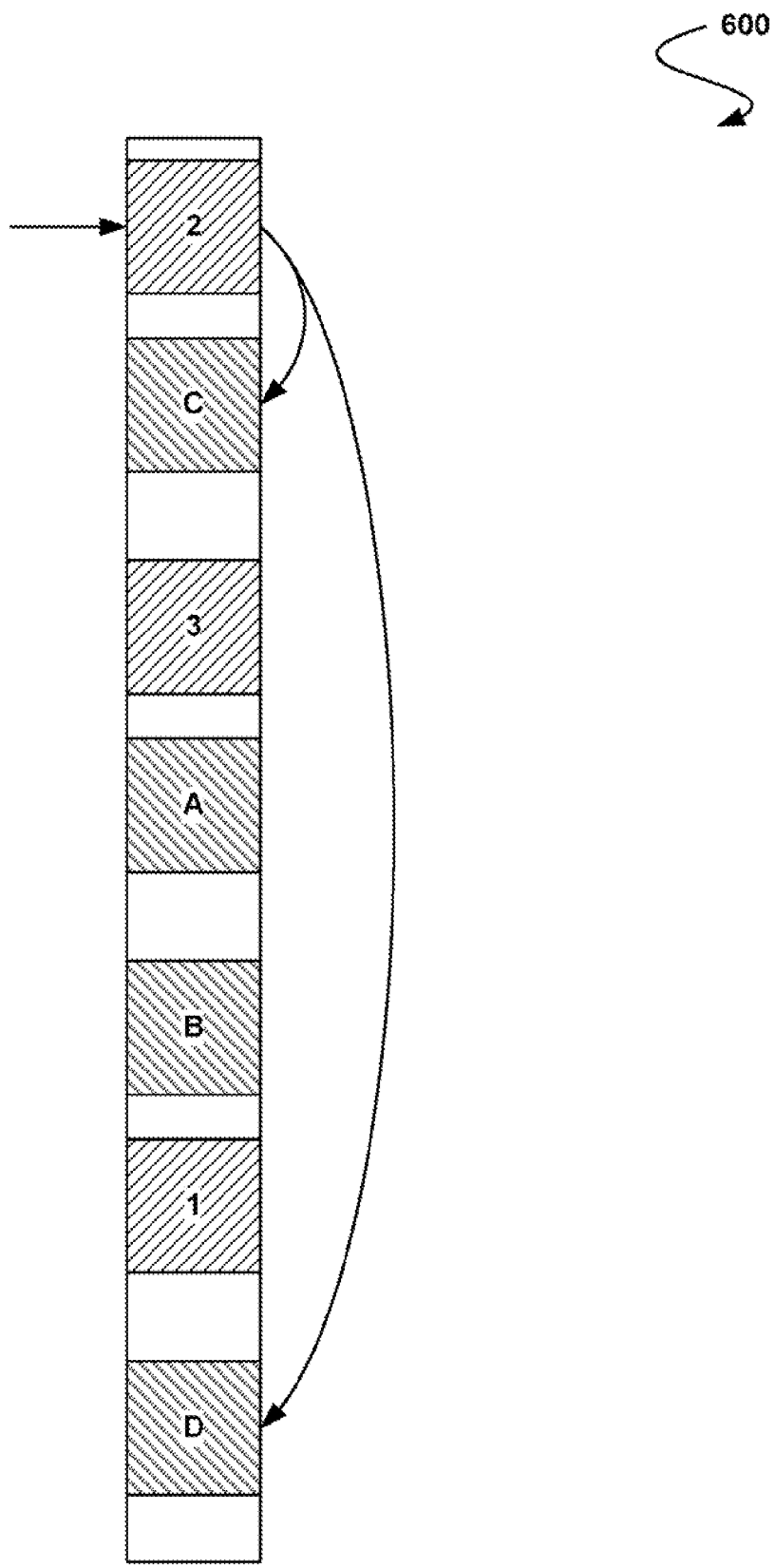

FIG. 6 shows another configuration 600 with four targets A, B, C, D which may correlate with four devices (e.g. graphics processors, etc.), in accordance with yet another embodiment. Similar to the configuration 500 of FIG. 5, there is no overlap of the targets A, B, C, D and the three broadcast apertures 1, 2, 3. However, as shown, a write operation is received at and replicated by the second broadcast aperture 2 and broadcasted to non-aperture targets C, D.

Figure 7:
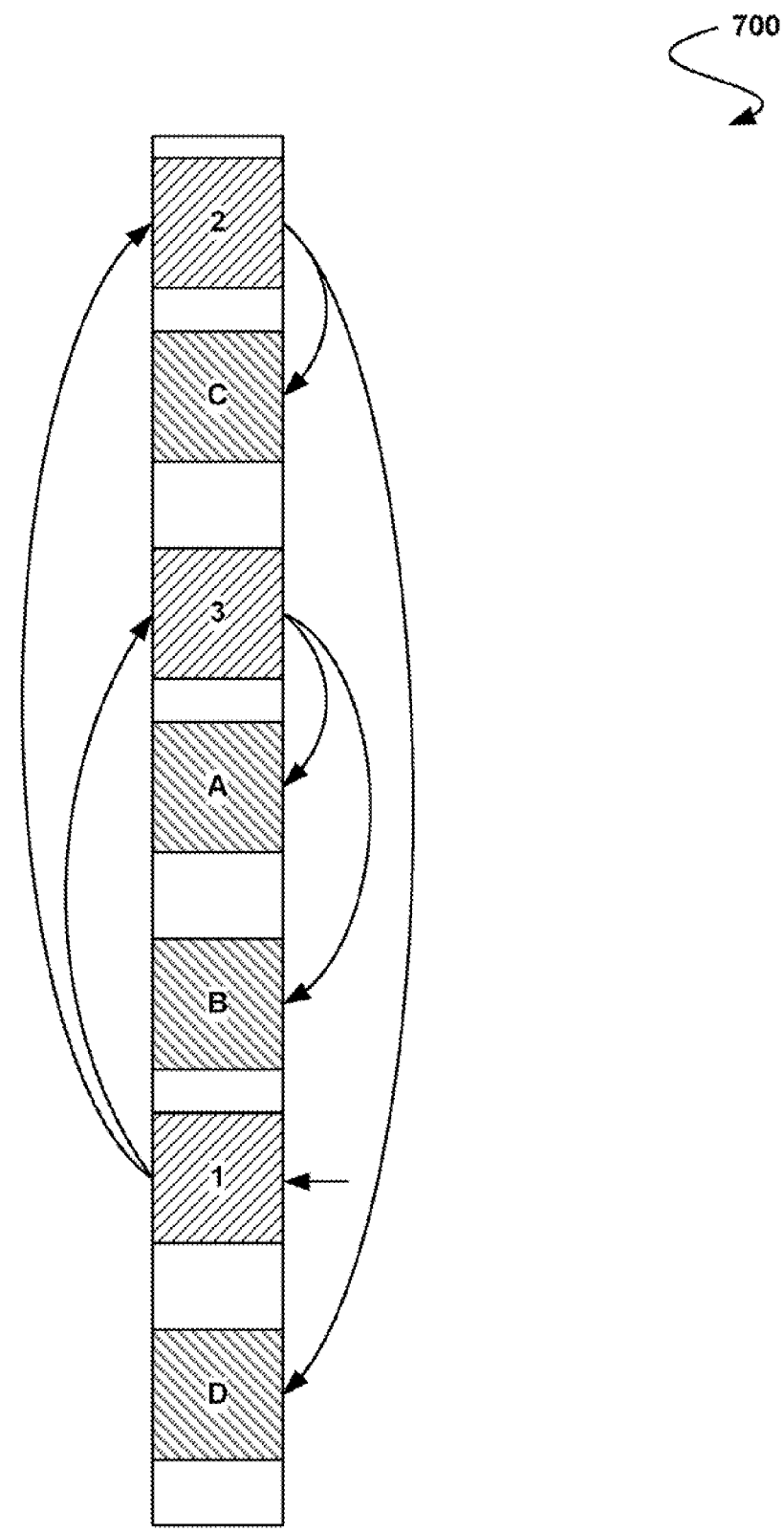

FIG. 7 shows another configuration 700 with four targets A, B, C, D which may correlate with four devices (e.g. graphics processors, etc), in accordance with still yet another embodiment. Similar to the configurations 500, 600 of FIGS. 5-6, there is no overlap of the targets A, B C, D and the three broadcast apertures 1, 2, 3. However, as shown, a write operation is received at and replicated by the first broadcast aperture 1 which broadcasts to the second and third broadcast apertures 2, 3. The write operation received at the second broadcast aperture 2 is replicated and broadcasted to non-aperture targets C, D. Further, the write operation received at the third broadcast aperture 3 is replicated and broadcasted to non-aperture targets A, B.

Figure 8:
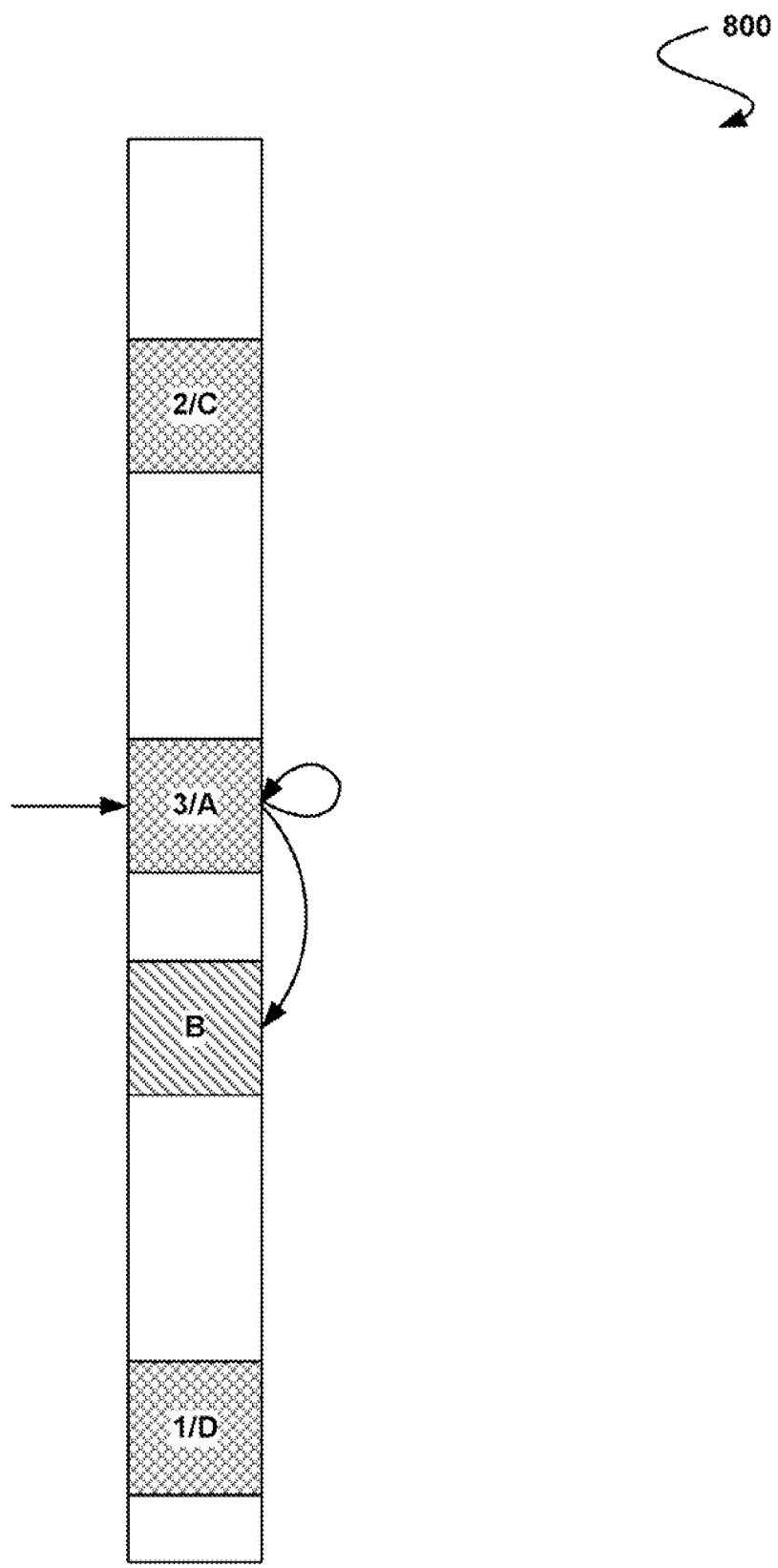

FIG. 8 shows a configuration 800 with four targets A, B, C, B which may correlate with four devices (e.g. graphics processors, etc.), in accordance with another embodiment. As shown, there is overlap of target A and a third broadcast aperture 3, target C and a second broadcast aperture 2, and target D and a first broadcast aperture 1. As further shown, a write operation is received at target A/third broadcast aperture 3 and is replicated for broadcast to non-aperture target B, and target A/third broadcast aperture 3. By targeting target A (which coincides with the third broadcast aperture 3), a write through results (e.g. no further write operations are replicated by the third broadcast aperture 3).

Figure 9:
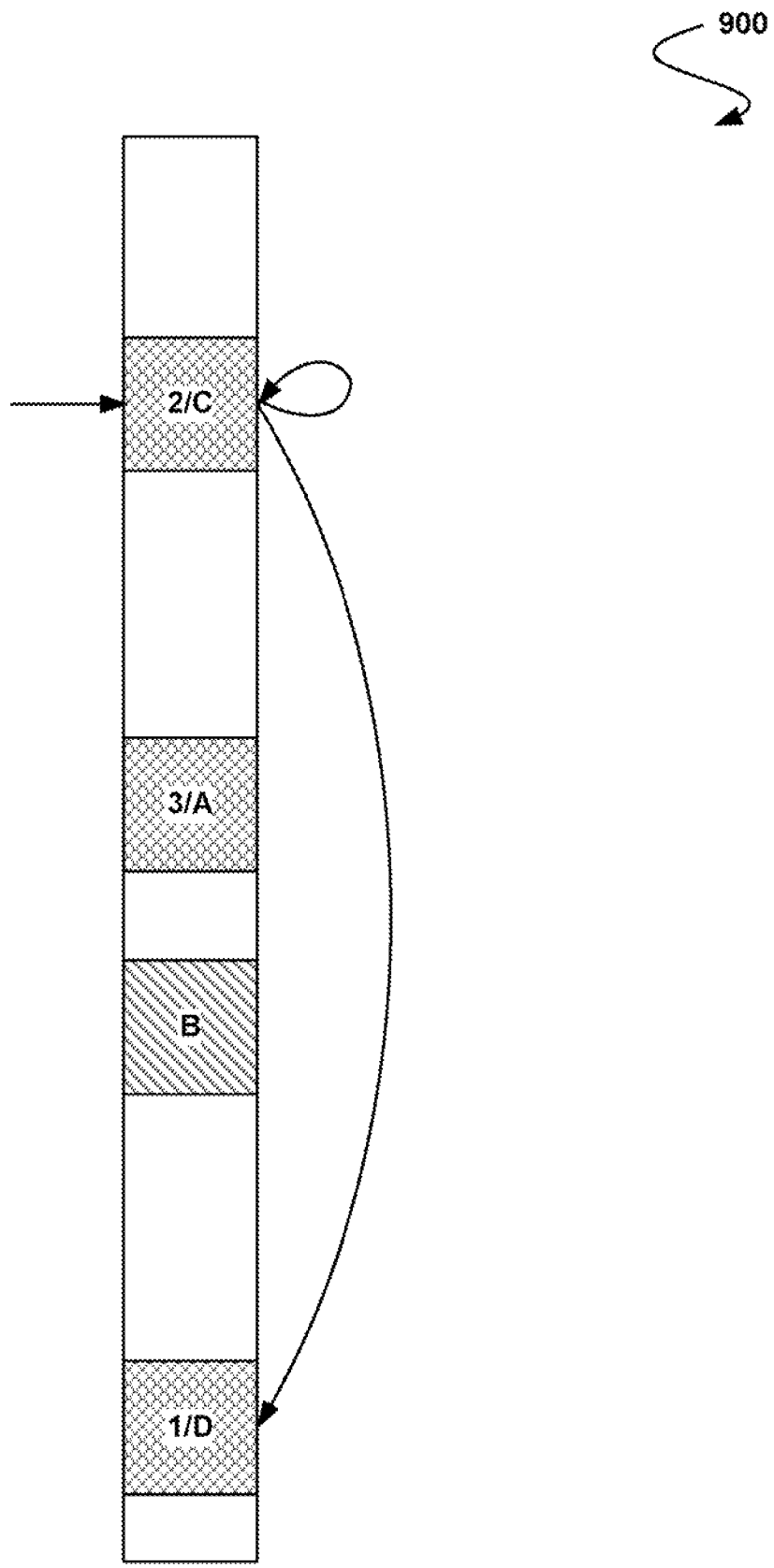

FIG. 9 shows a configuration 900 with four targets A, B, C, D which may correlate with four devices (e.g. graphics processors, etc.), in accordance with another embodiment. As shown, there is overlap of target A and a third broadcast aperture 3, target C and a second broadcast aperture 2, and target D and a first broadcast aperture 1. As further shown, a write operation is received at target C/second broadcast aperture 2 and is replicated for broadcast to target C/second broadcast aperture 2, and target D/first broadcast aperture 1. Similar to the situation in FIG. 8, the write operation received at target C results in a write through, in addition to a write operation targeting target D/first broadcast aperture 1.

In the present embodiment, a hierarchical rule may be established such that target addresses generated from the second and third broadcast apertures 2, 3 may target the base address range of the first broadcast aperture 1, but these do not generate additional write operations. Thus, by targeting target B (which coincides with the first broadcast aperture 1), any further write operation replication may be precluded.

Figure 10:
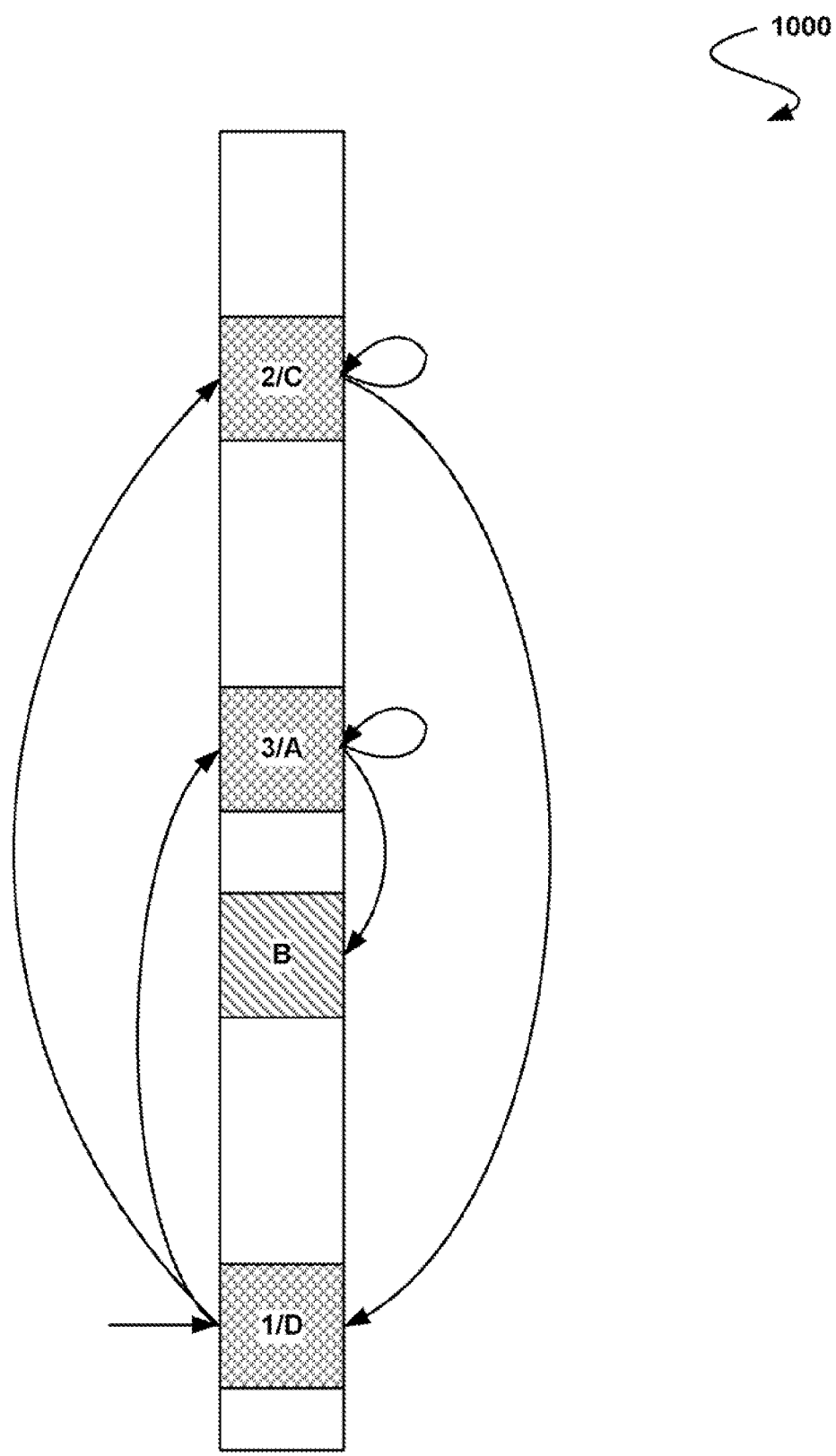

FIG. 10 shows a configuration 1000 with four targets A, B, C, D which may correlate with four devices (e.g. graphics processors, etc.), in accordance with another embodiment. As shown, there is overlap of target A and a third broadcast aperture 3, target C and a second broadcast aperture 2, and target D and a first broadcast aperture 1. As further shown, a write operation is received at target D/first broadcast aperture 1 and is replicated for broadcast to target A/third broadcast aperture 3, and target C/second broadcast aperture 2.

Similar to the situation in FIGS. 8-9, the write operation received at target C results in a write through, in addition to a write operation targeting target D/first broadcast aperture 1. Also similar to the previous embodiment of FIG. 9, a hierarchical rule may be established such that target addresses generated from the second and third broadcast apertures 2 3 may target the base address range of the first broadcast aperture 1, but these do not generate additional write operations. Thus, by targeting target D (which coincides with the first broadcast aperture 1), any further write operation replication may be precluded, as shown.

On the other hand, the write operation from the first aperture 1 that targeted target A/third broadcast aperture 3 may result in replicated write operations for broadcast to non-aperture target 8, and target A/third broadcast aperture 3. By targeting target A (which coincides with the third first broadcast aperture 3), a write through results (e.g. no further write operations are replicated by the third broadcast aperture 3). As the current configuration 1000 illustrates, overlapping the broadcast aperture base and target ranges allow for maximum flexibility in four multiple device systems.

More information will now be set forth regarding one illustrative framework, for the purpose of providing an implementation example. It should be strongly noted that the following details should not be construed as limiting in any manner. In such possible embodiment, three broadcast apertures may be enabled independently by setting various bits in a control register in a CPU PCI configuration space. Each aperture may, in such embodiment, include a memory region located in a system physical address space, as defined by a base register and a mask register. The base and mask registers may be 12 bits wide and be associated with address bits 35:24, for instance.

In the context of such example, the mask register determines which address bits 35:24 of a request matches base[35:24]. In other words, an address A is within a broadcast aperture if, for example: (A[35:24] & Mask[11:0])=(Base[11:0] & Mask[11:0]). Such exemplary definition results in broadcast apertures that can range in size from 16 MB to 64 GB and are naturally aligned.

In the present embodiment, two target registers may be associated with each broadcast aperture, say target A and target B. Bach target register may be 12 bits wide and be associated with address bits 35:24. When a write operation targets an enabled broadcast aperture, it may be redirected into an address region described by target A and a second write may be cloned with the same data and sent to the address region described by target B.

The offset of the redirected writes within each target address region may be the same as the offset of the original write operation within the broadcast aperture. In other words, an incoming write to address A within the broadcast aperture causes two write operations downstream as follows in Table 1.

TABLE 1

WriteA[35:24] = (TargetA[11:0] & Mask[11:0]) | (~Mask[11:0] & A[35:24])
WriteA[23:0] = A[23:0]
WriteB[35:24] = (TargetB[11:0] & Mask[11:0]) | (~Mask[11:0] & A[35:24])
WriteB[23:0] = A[23:0]

In one embodiment, the broadcast aperture may only affects posted writes. Posted-writes refer to write operations that do not require or solicit a response from the target. Reads or non-posted writes to any broadcast aperture may be unaffected and routed based upon their unmodified address.

In one embodiment, a third of the broadcast apertures may be different from the other two broadcast apertures in that its targets may overlap with the first two broadcast apertures. This may be used to create cascading broadcasts in which a single write operation from the CPU results in write operations to multiple (e.g. four) target addresses.

Table 2 illustrates various possible rules that may be applied in the context of relevant embodiments, as desired. Of course, such information is set forth for illustrative purposes only and should not be construed as limiting in any manner whatsoever.

TABLE 2

Target A and target B for each broadcast aperture may not overlap each other;
Enabled broadcast aperture base address ranges may not overlap other broadcast aperture base address ranges;
All bits in a mask register that are set to "1" are contiguous and of greater significance than any of the bits of the same mask register that are reset to "0;"
The broadcast mechanism is able to saturate a downstream FPCI bus with generated write traffic; and
The broadcast mechanism may not cause throttling of downstream CPU write operations unless downstream FPCI is saturated.

It should be noted that, in various embodiments, a system may or may not function for peer-to-peer traffic. Peer-to-peer write operations, such as a write from one PCIE controller to another, may not necessarily be modified or changed by some broadcast mechanisms. In other words, if a peer-to-peer write targets the address range of an active broadcast aperture, no additional writes or address modification occurs (i.e. the original address of the peer-to-peer write is maintained and sent downstream, etc.). Of course, other embodiments are contemplated that allow for peer-to-peer traffic.

In various embodiments, some software driver support may be used to ensure proper functionality. For example, in one embodiment local memory of a graphics processor may be located in a system physical address space at the address range defined by the graphics processor, in order to operate, the broadcast aperture target ranges may need to point to the local memory of the graphics processors in the system. While address assignment of the graphics processor local memory is normally static, it may possibly be relocated by an operating system for various purposes (e.g. to make room in the address space for a new device after a hotplug event, etc.). A mechanism may thus be used to allow the target ranges associated with the broadcast apertures to track any such changes.

In additional possible embodiments, registers configuring the broadcast apertures and corresponding target ranges may be associated with a CPU. Further, some operating systems may not necessarily allow a driver to reference resources associated with devices other than those with which they are associated. As a result, in platforms using such an operation system, the driver may not necessarily be able to directly move the broadcast target range. In such a case, a chipset driver may be provided to make changes to the CPU configuration as necessary to maintain the functionality of the broadcast apertures.

In one embodiment, some software interfaces may be provided which allow driver-to-driver communication. These interfaces may deal with rare events such as reprogramming a graphics processor base address register (BAR) during re-enumeration. In situations where an operating system device driver model does not make such interfaces available to the graphics driver, a filter driver may be provided which intercepts requests for the foregoing services and communicate with the aforementioned chipset device driver on behalf of the graphics driver.

In one embodiment, an update of a graphics processor BAR may proceed as set forth in Table 3 below,

TABLE 3

1. locate filter driver above a graphics mini driver;
2. SBIOS to provide advanced configuration and power interface (ACPI) method to program broadcast registers in a CPU;
3. detect when the BARs get moved by an upper level operating system; and
4. (once a move is detected) trigger the ACPI driver (using the filter driver) to launch the ACPI method in the BIOS to update the CPU registers.

Figure 11:
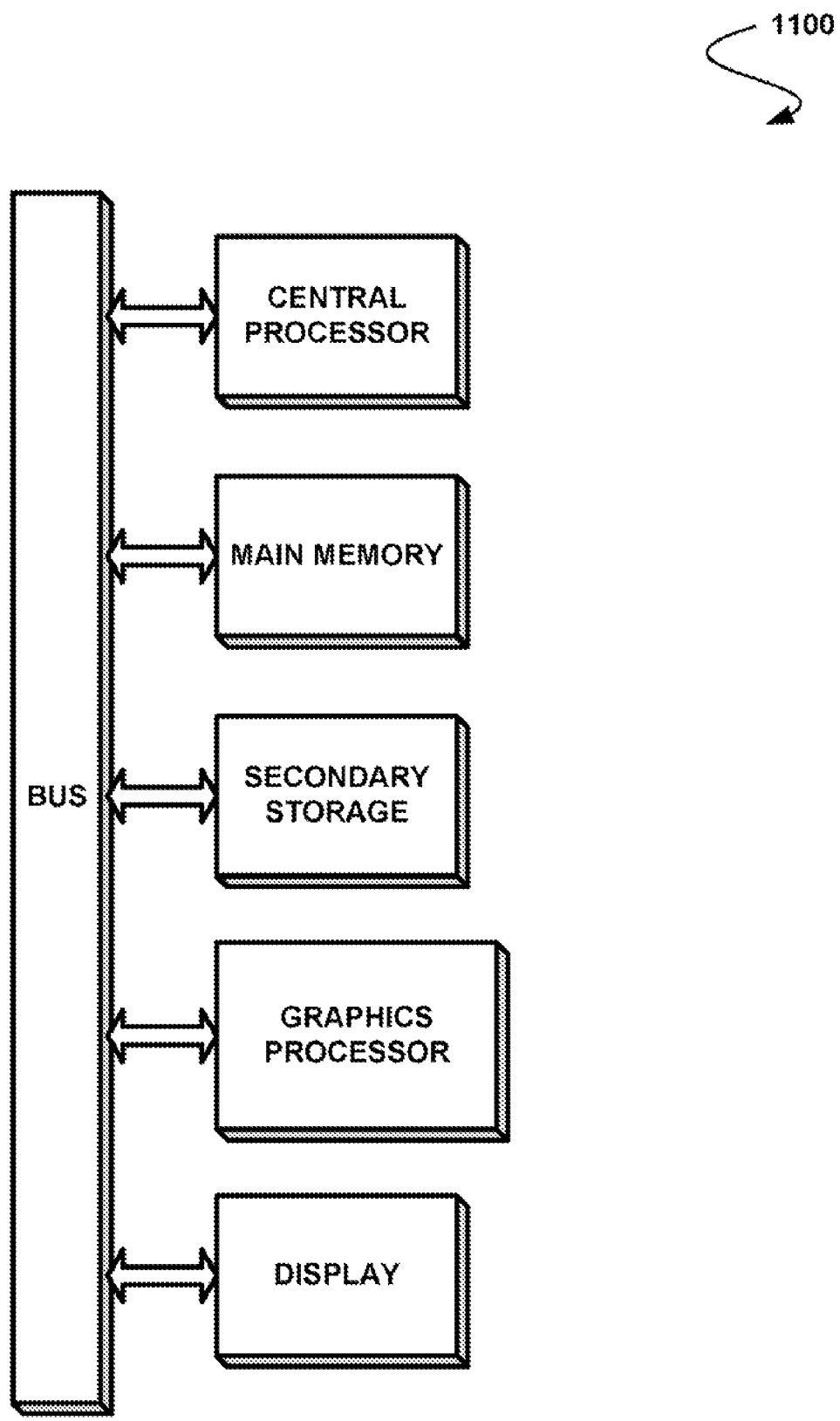
FIG. 11 illustrates an exemplary system in which the various architecture and/or functionality of the various previous embodiments may be implemented.

FIG. 11 illustrates an exemplary system 1100 in which the various architecture and/or functionality of the various previous embodiments may be implemented. As shown, a system 1100 is provided including at least one host processor 1101 which is connected to a communication bus 1102. The system MOO also includes a main memory 1104. Control logic (software) and data are stored in the main memory 1104 which may take the form of random access memory (RAM).

The system 1100 also includes a graphics processor 1106 and a display 110S, i.e. a computer monitor. In one embodiment, one or more graphics processors 1106 may each include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1100 may also include a secondary storage 1110. The secondary storage 1110 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1104 and/or the secondary storage 1110. Such computer programs, when executed, enable the system 1100 to perform various functions. Memory 1104, storage 1110 and/or any other storage are possible examples of computer-readable media.

In one embodiment, the architecture and/or functionality of the various previous figures may be implemented in the context of the host processor 1101, graphics processors) 1106, an integrated circuit (not shown) that is capable of at least a portion of the capabilities of both the host processor 1101 and the graphics processor(s) 1106, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1100 may take the form of a desktop computer, lap-top computer, and/or any other type of logic. Still yet, the system 1100 may take the form of various other devices m including, but not limited to a personal digital assistant (PDA) device, a mobile phone device, a television, etc.

Further, while not shown, the system 1100 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a write operation at one of a plurality of apertures of an address space;
replicating the write operation to produce a plurality of write operations; and
broadcasting the write operations to a plurality of targets:
wherein at least one of the targets includes another one of the apertures that produces at least one additional write operation;
wherein the apertures are assigned different hierarchies;
wherein the write operations are conditionally allowed based on a write operation level assigned based on which of the apertures was traversed by a particular write operation, and a hierarchy of one of the apertures targeted by the particular write operation.

2. The method of claim 1, wherein the apertures are hierarchically organized.

3. The method of claim 1, wherein the different hierarchies are predetermined.

4. The method of claim 1, wherein the particular write operation is allowed if the write operation level assigned based on which of the apertures was traversed by the particular write operation is greater than a hierarchy of one of the apertures targeted by the particular write operation.

5. The method of claim 1, and further comprising filtering the write operations to avoid an infinite loop.

6. The method of claim 1, wherein the targets include different portions of a single memory.

7. The method of claim 1, wherein the targets include portions of different memory integrated circuits.

8. The method of claim 1, wherein the targets include portions of memory of at least one graphics processor.

9. The method of claim 8, wherein the address space includes memory of a plurality of graphics processors.

10. The method of claim 9, wherein the graphics processors include graphics processing units.

11. The method of claim 1, wherein the at least one additional write operation is replicated to produce a plurality of additional write operations for a plurality of additional targets at least one of which includes another one of the apertures that produces at least one additional write operation.

12. The method of claim 1, wherein if one of the write operations targets an aperture which, in turn, targets itself, such write operation is disallowed.

13. The method of claim 1, wherein a third of the plurality of apertures of the address space are different from another two thirds of the plurality of apertures of the address space such that targets of the third of the plurality of apertures overlap with the other two thirds of the plurality of apertures for creating cascading broadcasts from a single write operation.

14. The method of claim 1, wherein the received write operation is conditionally replicated and broadcasted based on whether it requires or solicits a response from a target.

15. A computer program product embodied on a non-transitory computer readable medium, comprising:
   computer code for receiving a write operation at one of a plurality of apertures of an address space; and
   computer code for replicating the write operation to produce a plurality of write operations for a plurality of targets:
   wherein at least one of the targets includes another one of the apertures that produces at least one additional write operation;
   wherein the apertures are assigned different hierarchies;
   wherein the computer code is operable such that the write operations are conditionally allowed based on a write operation level assigned based on which of the apertures was traversed by a particular write operation, and a hierarchy of one of the apertures targeted by the particular write operation.

16. The computer program product of claim 15, wherein the apertures are hierarchically organized.

17. The computer program product of claim 15, wherein the different hierarchies are predetermined.

18. An apparatus, comprising:
   a driver for receiving a write operation at one of a plurality of apertures of an address space, and replicating the write operation to produce a plurality of write operations for a plurality of targets;
   wherein at least one of the targets includes another one of the apertures for producing at least one additional write operation;
   wherein the apertures are assigned different hierarchies;
   wherein the driver is operable such that the write operations are conditionally allowed based on a write operation level assigned based on which of the apertures was traversed by a particular write operation, and a hierarchy of one of the apertures targeted by the particular write operation.

19. The apparatus of claim 18, wherein the driver interfaces a processor that remains in communication with memory and a display via a bus.

* * * * *

UNITED STATES PATENT AND TRADEMARK OFFICE
CERTIFICATE OF CORRECTION

PATENT NO. : 7,969,445 B2  
APPLICATION NO. : 11/765676  
DATED : June 28, 2011  
INVENTOR(S) : Langendorf et al.

Page 1 of 1

It is certified that error appears in the above-identified patent and that said Letters Patent is hereby corrected as shown below:

In the claims:
Col. 8, line 43, please replace "targets:" with --targets;--;
Col. 9, line 31, please replace "targets:" with --targets;--.

Signed and Sealed this
Fourth Day of October, 2011

David J. Kappos
*Director of the United States Patent and Trademark Office*